Figure 1:
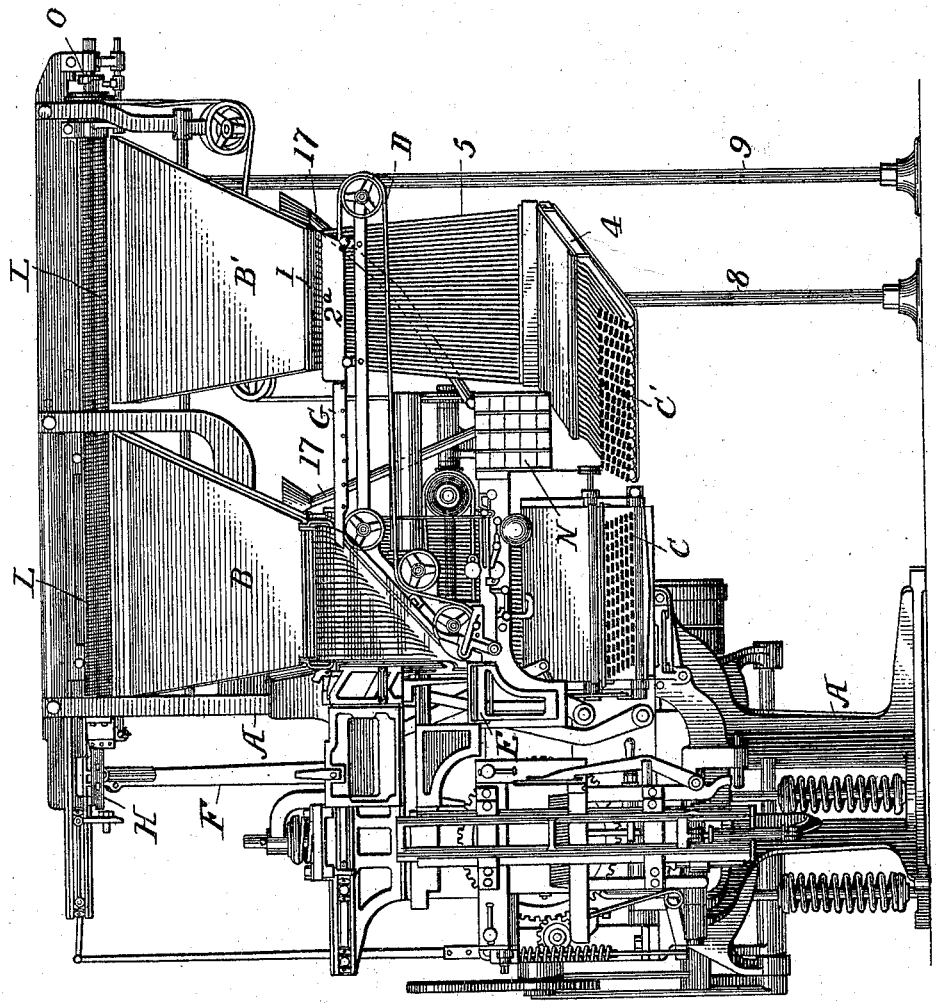

No. 608,067. Patented July 26, 1898.
C. MUEHLEISEN.
LINOTYPE MACHINE.
(Application filed Aug. 21, 1897.)

(No Model.) 7 Sheets—Sheet 1.

Witnesses
J. G. Hinkel
William E. Neff

Inventor
C. Muehleisen
J. H. Watson
Attorney

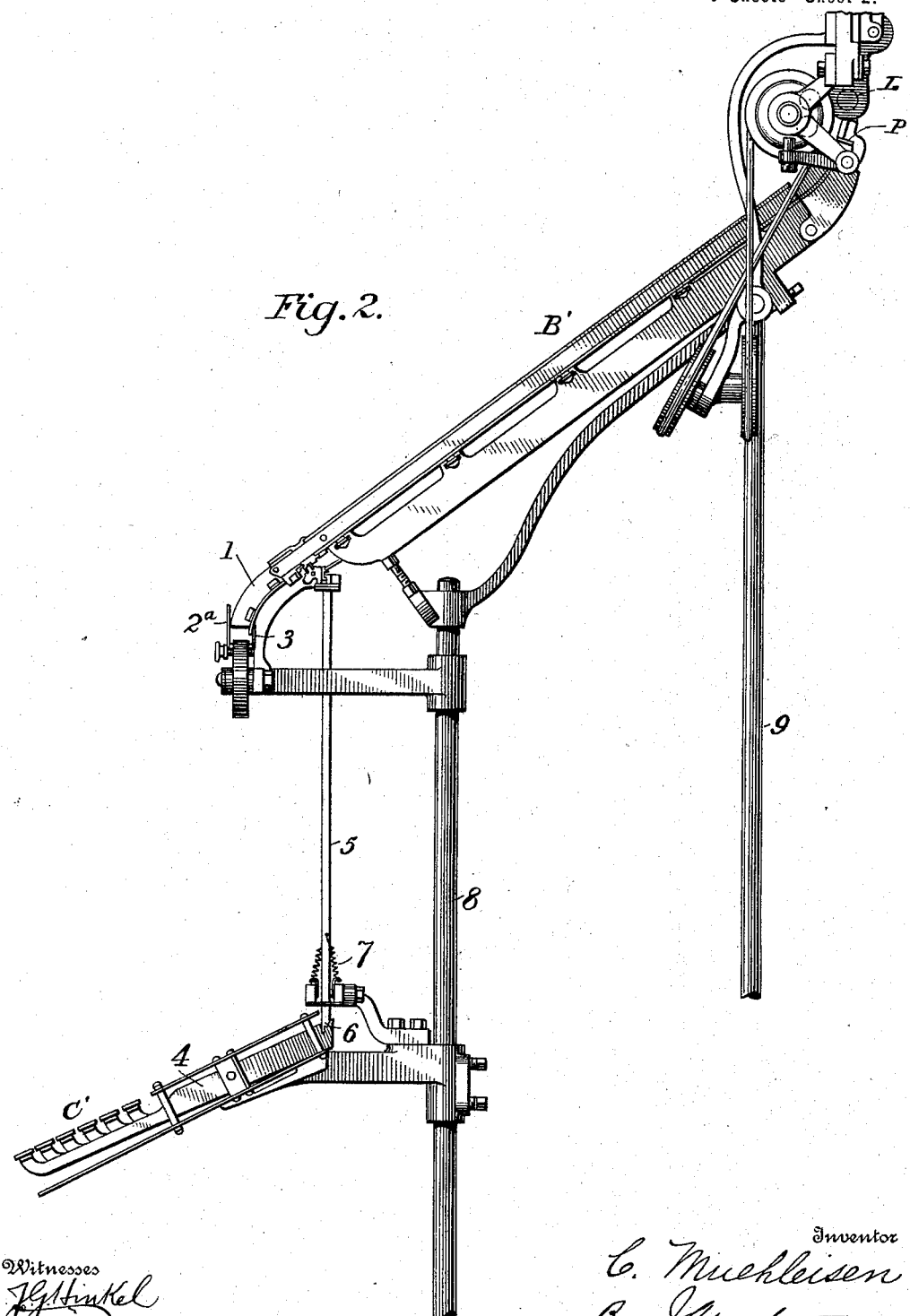

No. 608,067. Patented July 26, 1898.
C. MUEHLEISEN.
LINOTYPE MACHINE.
(Application filed Aug. 21, 1897.)
(No Model.) 7 Sheets—Sheet 3.
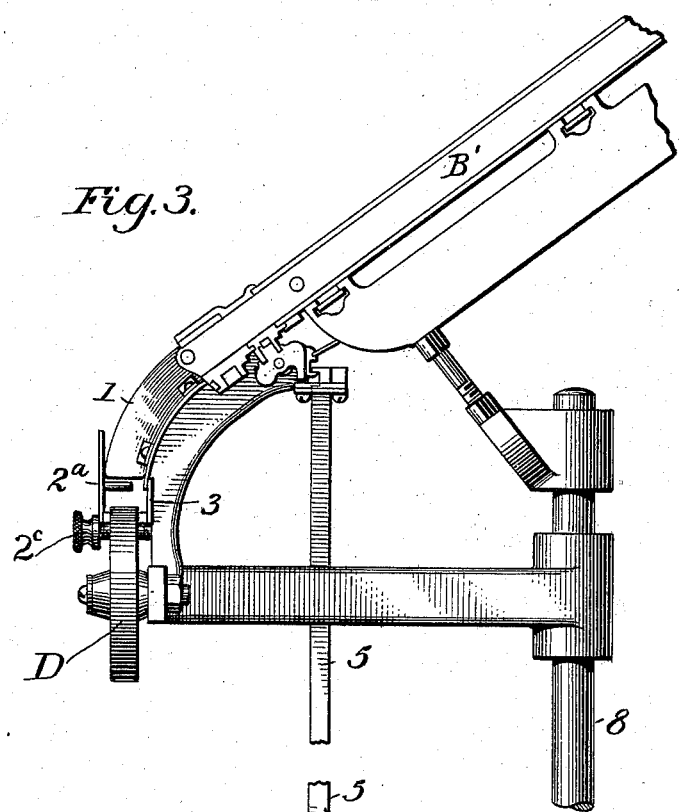
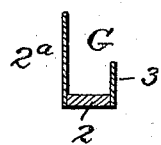
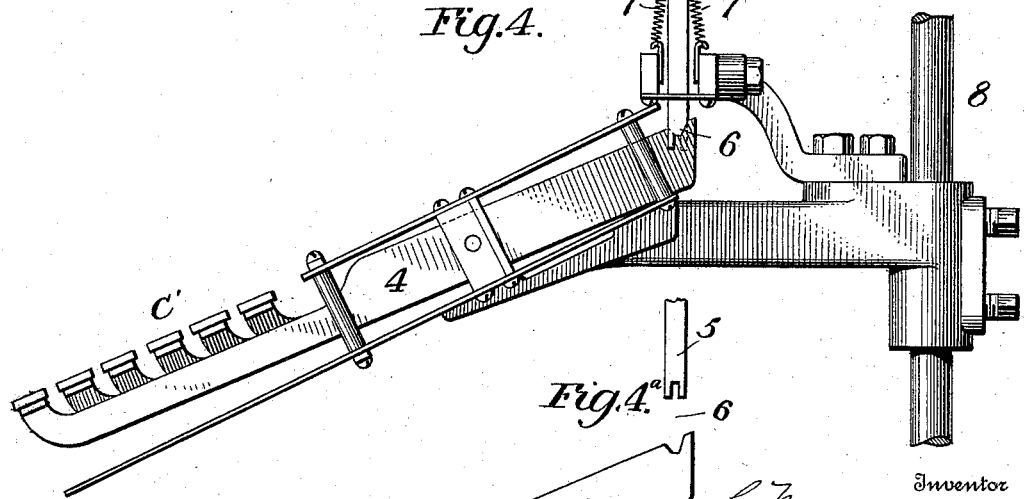
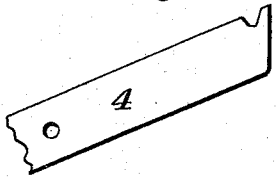
Witnesses
J. G. Hinkel
William E. Neff
Inventor
C. Muehleisen
By J. H. Watson
Attorney

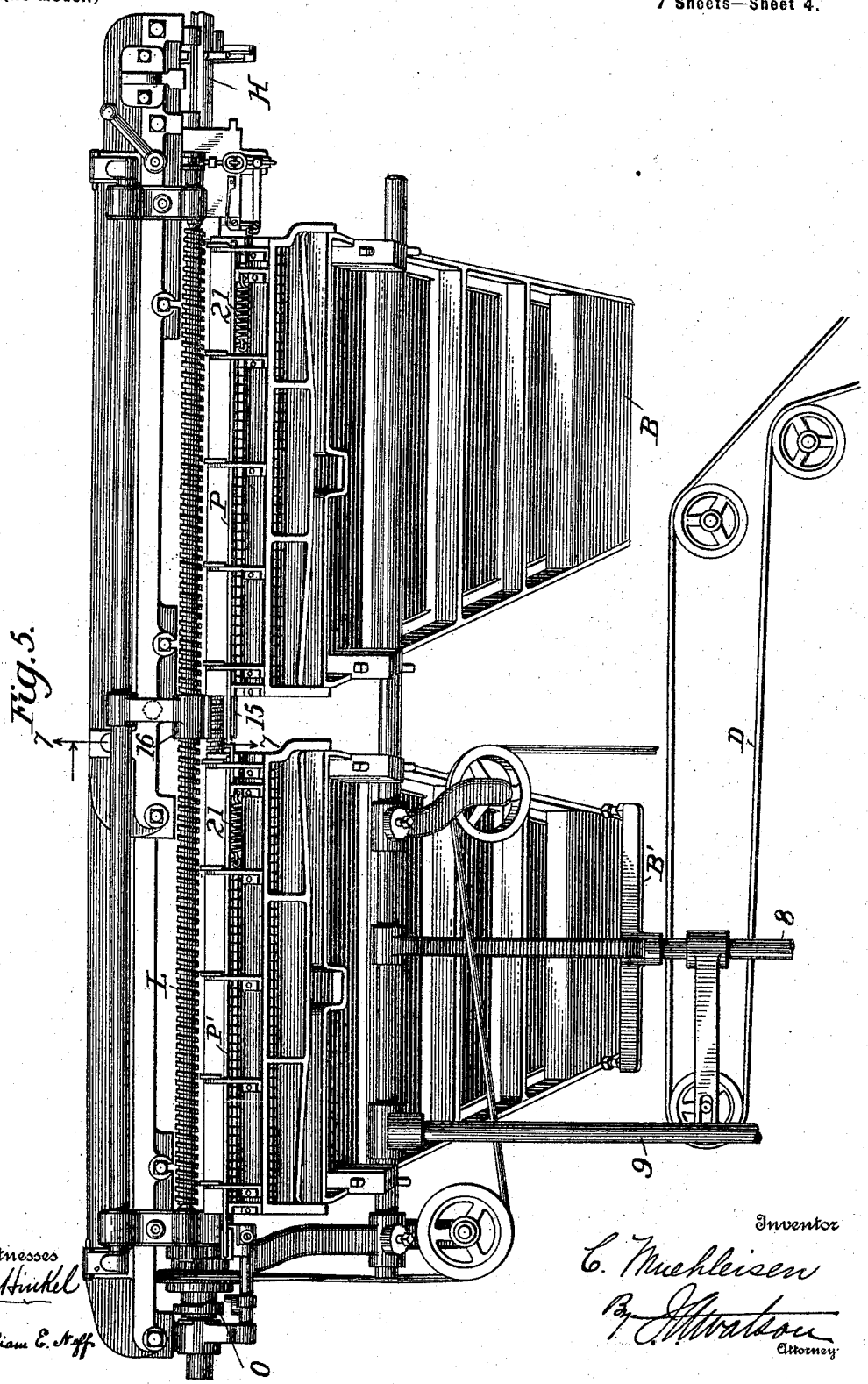

No. 608,067. Patented July 26, 1898.
C. MUEHLEISEN.
LINOTYPE MACHINE.
(Application filed Aug. 21, 1897.)
(No Model.) 7 Sheets—Sheet 5.

Witnesses
J. G. Hinkel
William E. Neff

Inventor
C. Muehleisen
by J. A. Watson
Attorney

No. 608,067. Patented July 26, 1898.
C. MUEHLEISEN.
LINOTYPE MACHINE.
(Application filed Aug. 21, 1897.)
(No Model.) 7 Sheets—Sheet 6.
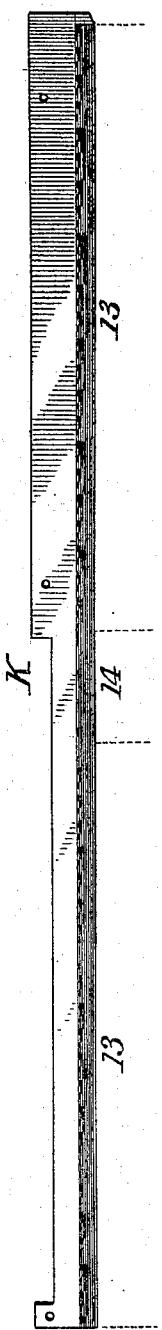

No. 608,067. Patented July 26, 1898.
C. MUEHLEISEN.
LINOTYPE MACHINE.
(Application filed Aug. 21, 1897.)
(No Model.) 7 Sheets—Sheet 7.

Witnesses
J. G. Hinkel
William E. Naff

Inventor
C. Muehleisen
By
J. Watson
Attorney

THE NORRIS PETERS CO., PHOTO-LITHO., WASHINGTON, D. C.

United States Patent Office.

CARL MUEHLEISEN, OF BALTIMORE, MARYLAND.

LINOTYPE-MACHINE.

SPECIFICATION forming part of Letters Patent No. 608,067, dated July 26, 1898.

Application filed August 21, 1897. Serial No. 649,053. (No model.)

*To all whom it may concern:*

Be it known that I, CARL MUEHLEISEN, a citizen of the United States, residing in the city of Baltimore, State of Maryland, have invented certain new and useful Improvements in Multiple-Magazine Linotype-Machines, of which the following is a specification.

The linotype-machines now in common use are provided with magazines in which there are tubes or channels for a set of matrices representing about ninety characters. In these machines it is often desirable, especially for bookwork, to have conveniently at hand a considerable number of matrices representing a number of additional characters; and it is the object of the present invention to provide machines of this class, such as those shown in United States Letters Patent Nos. 436,532 and 557,000, with any desired number of characters in addition to those carried by the usual magazine and to provide means for automatically assembling and automatically distributing the additional characters.

In carrying out the invention I provide the machine with a plurality of independent magazines so arranged that the matrices from them are delivered to a common assembling mechanism, and I provide a distributing mechanism arranged to automatically distribute all of the matrices to the proper tubes or channels in their respective magazines.

In the preferred form of the invention a common belt conveys the matrices from the delivery ends of the magazines to the place of assemblage, and a common distributing-rail delivers the matrices to their respective magazines.

The invention further consists in various details of construction which will be hereinafter described.

In the accompanying drawings a machine is shown having two magazines, this number being deemed sufficient for the purpose of illustrating the invention; but it will be understood that the common assembling and distributing mechanisms described may be extended to include any number of additional magazines.

Figure 6:
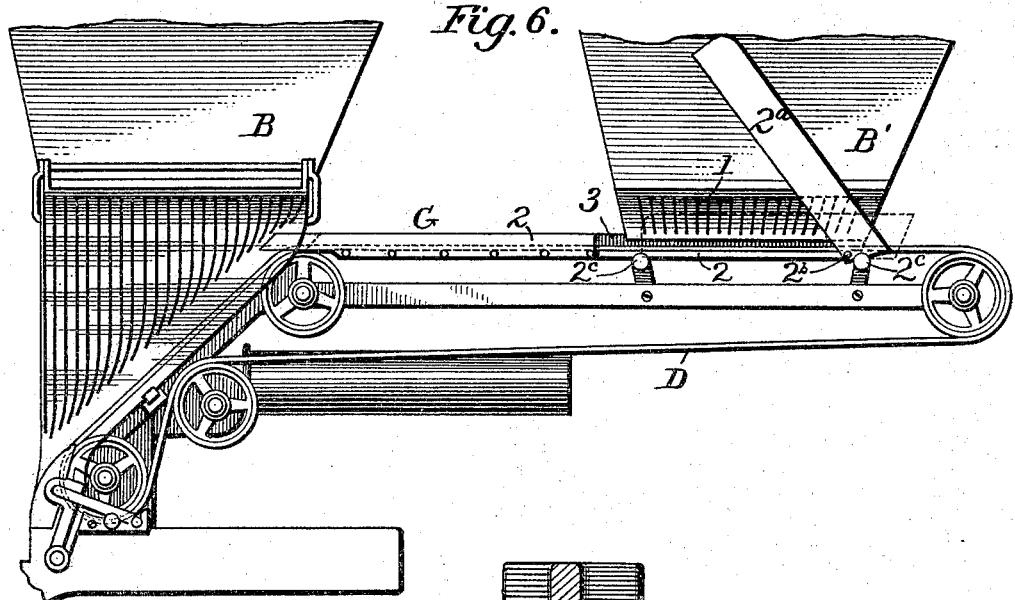
Figure 7:
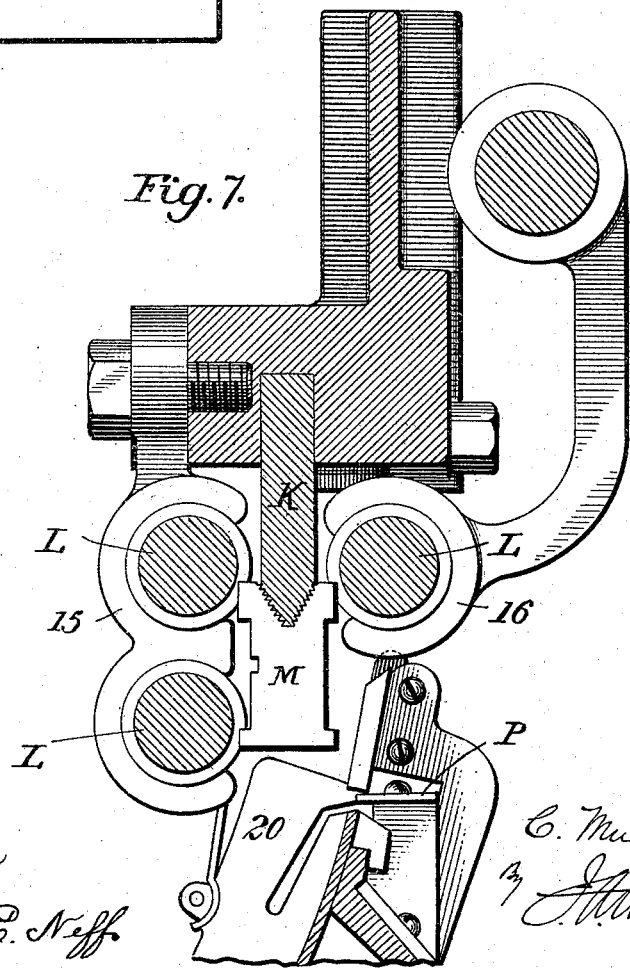
Figure 11:
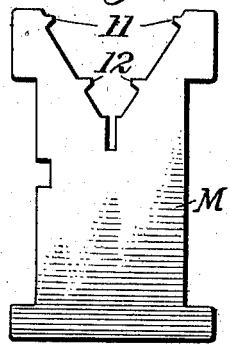
Figure 13:
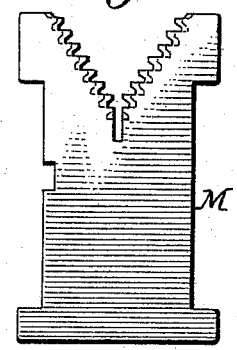
Figure 12:
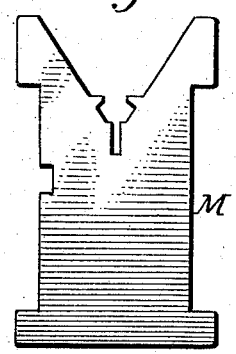
Figure 16:
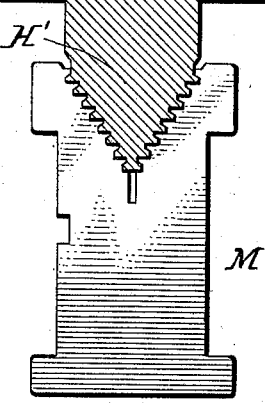
Figure 14:
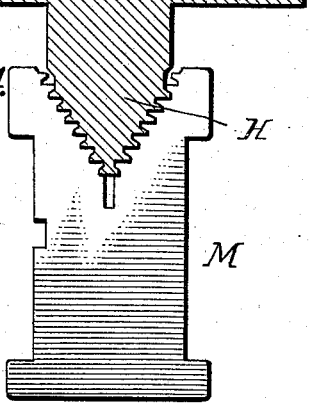
Figure 17:
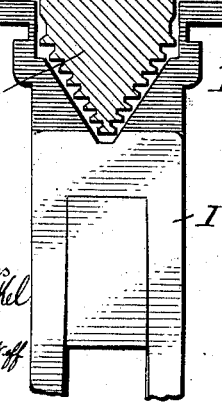
Figure 15:
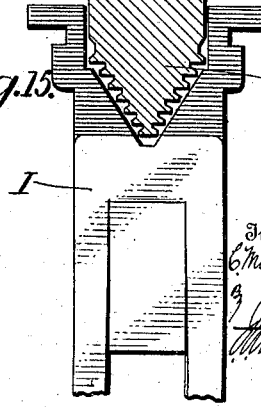

In the drawings, Figure 1 is a front elevation of a machine embodying the invention. Fig. 2 is an elevation of the right end of the machine on a larger scale. Figs. 3 and 4 are portions of Fig. 2 enlarged. Fig. 3$^a$ is a cross-section of the matrix-guide channel. Fig. 4$^a$ is a detail of the key-lever connection, showing parts separated. Fig. 5 is a rear elevation of the magazines and distributing mechanism. Fig. 6 is a portion of Fig. 1 enlarged. Fig. 7 is a section approximately on the line 7 7, Fig. 5. Fig. 8 is a side view of the distributer-rail. Fig. 9 is a plan view of the safety stop-racks. Fig. 10 is a rear view of the distributer feed-screws. Figs. 11 and 12 illustrate matrices. Fig. 13 illustrates the mode of adapting the standard matrices to the multiple-magazine machine. Figs. 14 and 15 are sections through the lifting-rail of the elevator, illustrating the relation of the matrices and space-bars to said rail; and Figs. 16 and 17 are corresponding views illustrating an eight-ribbed elevator-rail and its effect upon the space-bar.

It will be necessary to describe in detail only those parts of the machine embodying the present improvements. For a complete description of the remaining portions of the machine reference may be had to the patents above specified.

Referring to the drawings, A indicates the main frame; B B', magazines; C C', keyboards; D, an endless belt which receives the matrices from the magazines and conveys them to the assembling-block E, in which they are set up in a line preparatory to their being transferred to the casting mechanism by which a linotype or slug is produced, and F an elevator-arm which raises the matrices to the distributing mechanism after the linotype is cast.

The magazines B B' may be of any suitable construction, those shown being magazines of the standard linotype-machines illustrated in the above-mentioned patents. They are arranged at the same height, and the matrix-guides 1 of the magazine B' are shortened to permit the conveyer-belt to run horizontally from the magazine B' to the right edge of the magazine B. From this point the belt is inclined downward to the assemblage-block. The belt runs in a trough or channel G, having front and back sides 2 3, which keep the matrices in proper position on the belt, the sides being attached to a bottom 3$^a$ beneath the belt. The belt being first removed, the entire channel may be removed by sliding it to the right, as shown in dotted lines, Fig. 6, in order to detach it from magazine B, and the part $2^a$ in front of the magazine B' is pivoted at $2^b$ to the bottom of the channel and can be turned up to enable the operator to conveniently get at any matrices which may stick in passing from the magazine to the belt. The channel G rests detachably upon suitable supports $2^c$. When additional magazines are used, they are placed in line with the magazines B B', and the belt D is extended to receive the matrices from them.

The term "magazine" as used in this specification refers to a group or assemblage of tubes or receptacles capable of holding a font of matrices, which is its ordinary acceptation in the art.

The keyboard C may be identical with those shown in the patents heretofore mentioned. The keyboard C' preferably has the key-levers 4 inclined to the left from the magazine-operating rods 5 to bring the keys as close to the operator as possible. When additional magazines are used, the additional keyboards should also be arranged convenient to the operator. A very simple connection is made between the key-levers 4 and the operating-rods 5, which is accomplished by notching the lower ends of the rods and the upper edges of the key-levers, as illustrated at 6 in Figs. 2 and 3. The levers being at an angle to the plane of the rods permit the notches to mutually engage, the rods straddling the levers. The rods are normally held down by springs 7. The matrices are released by depressing the keys and raising the rods. The keyboard C' and the forward end of the magazine B' are supported on a standard 8, and the rear portion of the magazine is supported on a standard 9.

One object of the invention is to increase the capacity of existing linotype-machines by providing them with additional magazines having automatic distributers and to accomplish this change with the least possible expense. As is well known, about ninety characters are automatically distributed in the present linotype-machine, and the distributing capacity of the tooth combinations as now used on the standard matrices allows of distributing about thirty-four additional ones only; but if the increase in the number of matrices to be automatically distributed is more than this amount, as it will be required in most cases, then an increase in the number of combinations represented by the number of ribs of the distributer-rail and the teeth of the matrices is involved. The standard machines have seven ribs on each side of the distributer-rail and the standard matrices have coöperating teeth in seven positions. To increase the number of combinations sufficiently, an additional rib is added to each side of the distributer-rail, which results in doubling its capacity, and the teeth of the matrices are arranged in eight positions instead of seven. The old seven-toothed matrices are converted into eight-toothed matrices by enlarging their V-shaped openings, the new teeth being formed back of the old ones and the two new teeth added at the bottom, as illustrated in Fig. 13, in which the old teeth are shown in full lines and the new teeth in dotted lines. In this manner the old matrices may all be utilized in the improved machines.

In combination with the eight-toothed matrices and eight-ribbed distributer-rail a seven-ribbed elevator-rail H is used on the elevator F to avoid having to enlarge the openings in the spaces I that have to clear the rail. Naturally the eight-toothed matrices call for an eight-ribbed elevator-rail, as is shown in Fig. 16; but the construction of the spaces renders this impractical, as shown in Fig. 17, where a wide or eight-ribbed elevator-rail H' is shown in connection with a space to illustrate the effect of enlarging the notch in the space I to correspond. It will be seen that this would so weaken the connections of the ears 10 that they would be practically useless. The outer contour of the spaces could not be changed to strengthen them without going to great expense in reconstructing many parts of the machine to adopt them to the new contour. In order to preserve the strength of the spaces therefore, the width of the present elevator-rail having seven ribs is retained, as shown in Fig. 15. Each of the matrices having teeth 11 for engaging the upper ribs of the distributer-rail is also provided with one or more pair of teeth 12, so that they will also hang onto the seven-toothed rail H, that carries them up to the distributer. Of course there are also other matrices that do not carry the upper teeth at all, and one such is shown in Fig. 12.

Fig. 14 shows an eight-toothed matrix upon a seven-ribbed elevator-rail, there being no ribs to engage the uppermost teeth. The present invention, therefore, also comprises in combination an elevator-rail having a given number of ribs, a distributer-rail having a greater number of ribs, matrices having teeth adapted to engage the distributer-rail and also adapted to engage the elevator-rail, and spaces having openings corresponding to the width of the elevator-rail. It will be understood from the prior patents that the elevator-rail raises the matrices only and leaves the spaces to be transferred by other mechanism to the space-magazine.

Directly over the magazines is the distributing mechanism, consisting principally of the distributer-rail K and the feed-screws L. The means for transferring the matrices from the elevator-rail H to the distributer-rail are fully described in United States Patent No. 436,532 and need not be referred to here, as they do not form part of the present invention. The matrices are carried along by the screws and dropped from the rail into their proper magazine-tubes in a manner which is now well known. According to the present invention the distributer-rail and the feed-screws extend continuously along the entire series of magazines, whether there be two or more of them. The rail has a permuted section 13 for each magazine, the sections being separated by intermediate sections 14, which carry all of the matrices designed for the magazines beyond. The feed-screws are necessarily long, and it is preferred to support them between the magazines by means of suitable bearings. This is effected without destroying their continuity as matrix-conveyers by supporting them in bearings 15 16, which partially inclose the screw-threads, the bearings being open at their inner sides to permit the matrices M to pass, as shown in Figs. 5, 7, and 10. In this manner matrices may be automatically distributed to two or more magazines.

Sorts-matrices which are infrequently used may be kept in a case N, convenient to the the operator. Such matrices will be automatically returned to a box adjacent to said case through tubes 17, into which they are dropped by the distributer.

The distributer is provided with an automatic stop mechanism (indicated at O) which, as illustrated, is substantially the same as that described in Patent No. 436,532, and need not, therefore, be referred to in detail. The object of the stop mechanism is to automatically stop the distributer-screws whenever a matrix fails to drop properly into its magazine-channel. The mechanism is operated by stop-racks P P', Figs. 5, 7, and 9, lying in the rear of the upper ends of the magazines. The stop-racks are fastened by screws or pins passing loosely through slots 18, which permit a slight longitudinal movement sufficient to disengage the clutch which operates the feed-screws. On the forward edge of the racks are teeth 19, which engage the flexible upper ends 20 of the magazine-partitions.

The stop-rack mechanism is preferably formed in sections corresponding in number to the magazines, each magazine carrying its own stop-rack, the adjacent ends of the sections normally abutting. When the section P is operated, it carries the section P' with it; but when the section P' is operated section P remains idle. When a matrix sticks at the entrance to any of the magazine-tubes, it will be forced forward against the flexible partition 20 by the lower screw or by the succeeding matrix, and a movement will thus be imparted to the stop-rack sufficient to disengage the clutch and stop the distributing mechanism. The distributer remains at rest until the cause of the trouble is removed, when it is again started by hand. The stop-racks are normally drawn to the right out of engagement of the stop mechanism by springs 21, Fig. 5.

I am aware that it has heretofore been proposed to use, in addition to the ordinary magazine of a linotype-machine, a supplemental magazine into which matrices were introduced by hand and from which they were conveyed through a common tube to the belt of the assembling mechanism; but I believe myself to be the first to provide a linotype-machine with a plurality of distinct magazines each having a plurality of tubes or receptacles and with distributing means constructed to automatically distribute matrices to all of said magazines, and do not limit myself in this respect to the position or arrangement of the magazines; and I also believe myself to be the first to combine a series of magazines arranged in line or tandem with common means for conveying the matrices to the point of assemblage and a common matrix-distributer.

What I claim, and desire to secure by Letters Patent, is—

1. In a linotype-machine, a plurality of magazines simultaneously operative and each having a plurality of tubes or receptacles, in combination with distributing means in said machine constructed to automatically distribute matrices to all of said magazines.

2. In a linotype-machine, a composing mechanism, in combination with a plurality of magazines simultaneously operative and each having a plurality of tubes or receptacles, and an automatic distributing mechanism common to said magazines.

3. In a linotype-machine, a plurality of magazines arranged in line, or tandem, each magazine having a plurality of tubes or receptacles, in combination with a common distributing mechanism for all of said magazines.

4. In a linotype-machine, the combination of a plurality of magazines, and a keyboard for each magazine, with distributing means in said machine constructed to automatically distribute matrices into said magazines.

5. In a linotype-machine, the combination of a plurality of magazines, a keyboard for each magazine, and a common assembling-belt, with distributing means in said machine constructed to automatically distribute matrices to said magazines.

6. In a linotype-machine, a plurality of magazines arranged in line or tandem, each magazine having a plurality of tubes or receptacles, in combination with a common distributer-rail and feed-screws.

7. In a linotype-machine, a plurality of magazines arranged in line or tandem and each having a plurality of tubes or receptacles, in combination with a common distributer-rail having a like plurality of permuted sections, one for each magazine, substantially as described.

8. In a linotype-machine, a plurality of magazines, in combination with a common distributer-rail, and common feed-screws having intermediate bearings, said bearings having openings to permit matrices to pass, substantially as described.

9. In a linotype-machine, a distributer-rail, in combination with matrix feed-screws provided with end bearings and with intermediate bearings which have openings to permit matrices to pass, the screw-threads being continuous through said intermediate bearings, substantially as described.

10. In a linotype-machine, a plurality of magazines arranged in line, or tandem, each magazine having a plurality of tubes or receptacles, in combination with automatic distributing mechanism in said machine for said magazines, stop mechanism for the distributing mechanism, and a plurality of distributer stop-racks arranged in tandem for operating the stop mechanism, substantially as described.

11. In a linotype-machine, the combination with a distributer-rail having a given number of ribs, and an elevator-rail having a lesser number of ribs, of a series of matrices having V-shaped openings and shoulders corresponding to the distributer-rail, and a series of spaces having smaller V-shaped openings corresponding to the elevator-rail, substantially as described.

12. In a linotype-machine, the combination with a series of matrices having V-shaped openings and a series of spaces having smaller V-shaped openings, of a distributer-rail having a given number of ribs, and an elevator-rail having ribs corresponding to all of the ribs of the distributer-rail excepting the uppermost rib on each side thereof, said uppermost ribs having no counterpart on the elevator-rail, whereby the elevator-rail is adapted for the spaces having smaller V-shaped openings than the matrices, substantially as described.

13. In a linotype-machine, the combination with a magazine, of a removable matrix-guide channel in which the assembling-belt runs, said channel comprising a bottom and two sides and having its front side hinged, substantially as described.

14. In a linotype-machine, the operating-rods having notches in their lower ends and the key-levers arranged at an angle to said rods and provided with notches in their rear ends, the notches of said rods and levers being adapted to mutually engage each other, substantially as described.

In testimony whereof I affix my signature in presence of two witnesses.

CARL MUEHLEISEN.

Witnesses:
  THOS. KELL BRADFORD,
  SAML. D. BRADFORD.